United States Patent
Diab et al.

(10) Patent No.: US 9,219,676 B2
(45) Date of Patent: *Dec. 22, 2015

(54) SYSTEM AND METHOD FOR EXCHANGING CHANNEL, PHYSICAL LAYER AND DATA LAYER INFORMATION AND CAPABILITIES

(71) Applicant: Broadcom Corporation, Irvine, CA (US)

(72) Inventors: Wael William Diab, San Francisco, CA (US); Nicholas Ilyadis, Merrimack, NH (US); Sesha Thalpasai Panguluri, Cupertino, CA (US)

(73) Assignee: BROADCOM CORPORATION, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/036,483

(22) Filed: Sep. 25, 2013

(65) Prior Publication Data

US 2014/0022929 A1 Jan. 23, 2014

Related U.S. Application Data

(63) Continuation of application No. 13/041,482, filed on Mar. 7, 2011, now Pat. No. 8,565,111.

(51) Int. Cl.
 *H04L 12/10* (2006.01)
 *H04L 12/26* (2006.01)
 *H04L 29/06* (2006.01)

(52) U.S. Cl.
 CPC ............ *H04L 43/50* (2013.01); *H04L 12/10* (2013.01); *H04L 69/24* (2013.01); *Y02B 60/43* (2013.01)

(58) Field of Classification Search
 None
 See application file for complete search history.

(56) References Cited

U.S. PATENT DOCUMENTS

| | | | |
|---|---|---|---|
| 7,808,249 B1 | 10/2010 | Lo et al. | |
| 2007/0283173 A1* | 12/2007 | Webb et al. | 713/300 |
| 2008/0170509 A1 | 7/2008 | Diab et al. | |
| 2008/0310067 A1 | 12/2008 | Diab et al. | |
| 2009/0049937 A1 | 2/2009 | Diab | |
| 2010/0046543 A1* | 2/2010 | Parnaby | 370/465 |
| 2010/0214708 A1 | 8/2010 | Diab et al. | |
| 2010/0214946 A1 | 8/2010 | Diab et al. | |
| 2011/0012608 A1 | 1/2011 | Diab | |
| 2011/0313692 A1 | 12/2011 | Diab et al. | |
| 2012/0054563 A1 | 3/2012 | Diab | |

FOREIGN PATENT DOCUMENTS

| | | |
|---|---|---|
| CN | 1620026 | 5/2005 |
| CN | 100428699 C | 10/2008 |

OTHER PUBLICATIONS

IEEE Std 802.3at™-2009, Oct. 30, 2009.

(Continued)

*Primary Examiner* — Hassan Phillips
*Assistant Examiner* — Omeed D Rahgozar
(74) *Attorney, Agent, or Firm* — Foley & Lardner LLP; Christopher J. McKenna; Helen H. Zhang (57) ABSTRACT

A system and method for exchanging channel, physical layer and data layer information and capabilities. The exchange of channel, physical layer and data layer capabilities enables optimal solutions for the provision of network services. In one embodiment, channel, physical layer and data layer capabilities are exchanged during an auto-negotiation process or LLDP messaging.

16 Claims, 5 Drawing Sheets

(56) References Cited

OTHER PUBLICATIONS

PHY Based Cable Diagnostic Definitions, Jul. 2004.
Office Action, Korean Patent Office, Feb. 26, 2013.
CN Office Action, Dec. 11, 2013.
Chinese Office Action for Chinese Patent Application No. 2012100579119 mailed Apr. 3, 2015 (including English summary).
Office Action for Chinese Patent Application No. 201210057911.9 mailed Jun. 9, 2014 (including English summary).
Office Action for Chinese Patent Application No. 201210057911.9 mailed Oct. 28, 2014 (including English summary).
Office Action for Chinese Patent Application No. 2012100579119 mailed Sep. 28, 2015 (including English summary).

* cited by examiner

| 0-10 | 11 | 12 | 13 | 14 | 15 |
|---|---|---|---|---|---|
| Data Bits | Toggle | Ack2 | Message Page | Ack | Next Page |

SYSTEM AND METHOD FOR EXCHANGING CHANNEL, PHYSICAL LAYER AND DATA LAYER INFORMATION AND CAPABILITIES

This application is a continuation of non-provisional application Ser. No. 13/041,482, filed Mar. 7, 2011, which is incorporated herein by reference in its entirety.

BACKGROUND

1. Field of the Invention

The present invention relates generally to network links and, more particularly, to exchanging channel, physical layer and data layer information and capabilities.

2. Introduction

Physical layer devices are designed to communicate over a communication channel, which can include physical media such as twisted pair cabling, fiber optics cabling, coaxial cabling, etc. The characteristics of the communication channel are significant in its impact on the ability of the physical layer devices to support various link speeds and various types of network services.

As is well known, the characteristics of the communication channel are a key determinant in identifying a link speed at which the physical layer devices can operate. Consider for example, communication over twisted pair cabling. Various communication channel characteristics over twisted pair cabling have been defined through the various Ethernet cable types, such as Category 3, 5, 5e, 6, 6A, 7, 7A, etc. Ethernet cabling. Each of these Ethernet cable types define a particular level of communication channel characteristics, which can correspondingly support different levels of transmission performance.

For example, Category 3 unshielded twisted pair cabling enables 10BASE-T transmission but not 100 BASE-TX transmission, which requires communication channel characteristics exhibited by Category 5 cabling. Category 6 cabling has since been defined and can support 1000 BASE-T operation as well as limited reach for 10 GBASE-T. Still further, advanced Category 6A, 7, and 7A cabling types have been defined for 10 GBASE-T, with Category 7A cabling and beyond likely supporting speeds of 40 G and beyond. In general, the transmission rate on a link, or more generally the delivery of services on a link, is dependent on the ability to take advantage of physical layer properties associated with the connected devices and the communication channel characteristics (e.g., type of cabling, length of cabling, connectors, etc). What is needed therefore is a mechanism that enables the devices to coordinate their channel, physical layer, and data layer information and capabilities to deliver network services efficiently.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The diagnostic capabilities of physical layer devices (PHYs) have increased as PHY manufacturers seek to enhance the ability of PHYs to tailor their performance to a particular link environment or installation. In one example, a PHY can be designed to directly measure link characteristics such as insertion loss, cross talk, and length of the Ethernet cable for noise cancellation/compensation purposes. In another example, a PHY can receive measurements that are performed through a physical layer subsystem. For instance, a power over Ethernet (PoE) physical layer subsystem can be designed to measure a resistance of an Ethernet cable to determine a power loss attributable to the Ethernet cable for power budgeting purposes in the PoE system. In yet another example, a PHY can receive measurements from higher layer technologies (e.g., Ethernet AVB discovery).

In the present invention, it is recognized that the diagnostic capabilities within the PHYs will vary significantly between manufacturers, thereby resulting in a disparity of the diagnostic capabilities within a typical link between a pair of PHYs. While the disparity of the diagnostic capabilities can lead to differences in measurement capabilities, a greater issue is the lack of coordination between devices in configuring the PHYs and/or associated subsystems.

Figure 1:
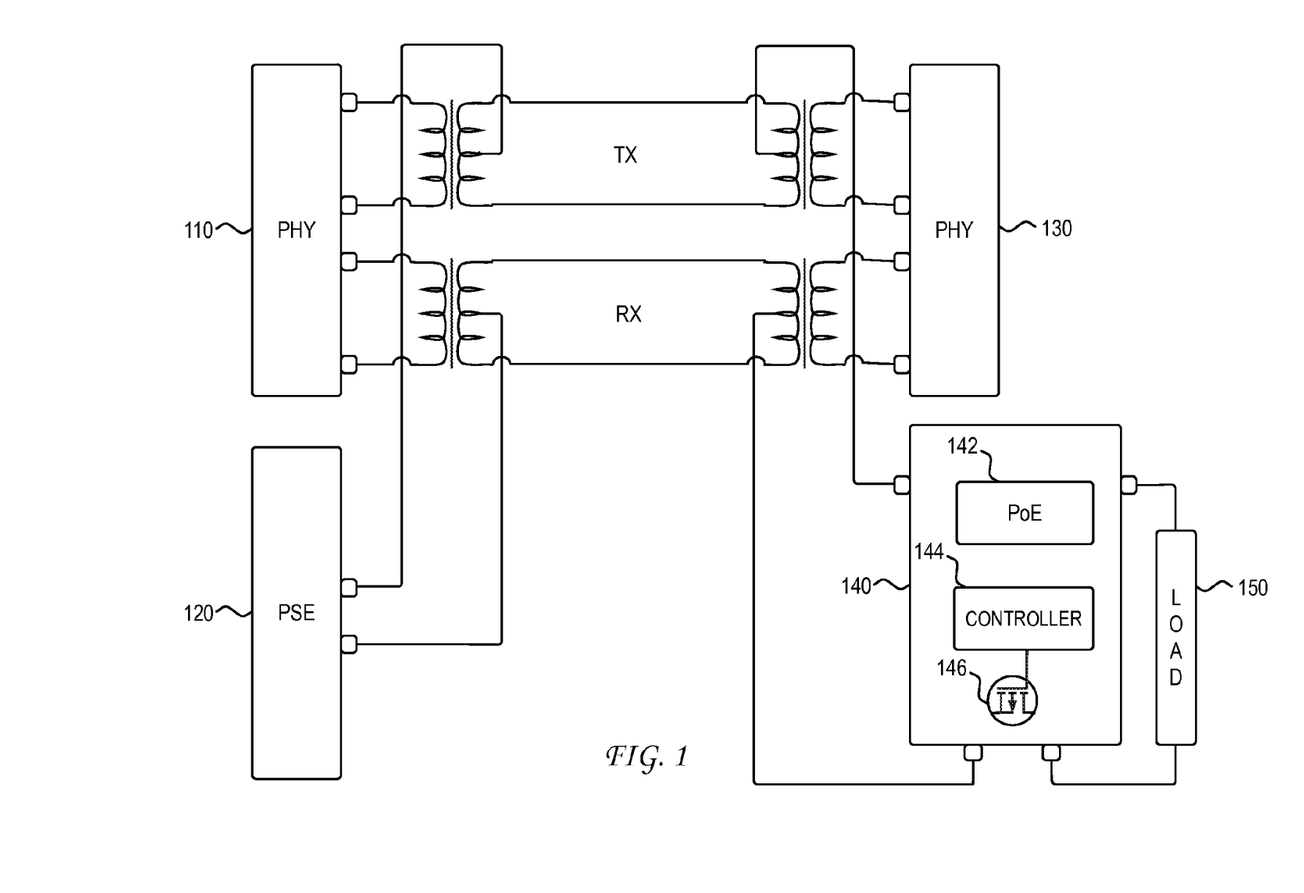
FIG. 1 illustrates an example power over Ethernet link.

To illustrate a simple example of the impact of mismatched diagnostic capabilities and a lack of coordination between devices, consider a PoE link between a power sourcing equipment (PSE) and a powered device (PD). In general, the PoE link such as that illustrated in FIG. 1 is based on a PSE 120 that transmits power to PD 140 through the application of a voltage across the center taps of transformers that are coupled to a transmit (TX) pair and a receive (RX) pair of wires carried within an Ethernet cable. The two TX and RX pairs enable data communication between Ethernet PHYs 110 and 130. As illustrated in FIG. 1, PD 140 includes PoE module 142, which includes the electronics that would enable PD 140 to communicate with PSE 120 in delivering PoE services in accordance with IEEE 802.3at-2009. PD 140 also includes pulse width modulation (PWM) DC:DC controller 144 that controls power FET 146, which in turn provides constant power to load 150.

One of the challenges in operating a PoE system is the distribution by the PSE of a fixed power budget amongst a plurality of PDs. Typically, a PSE's power budget is oversubscribed as the power demands of a plurality of connected PDs is greater than an available amount of power that can be delivered by the PSE. To maximize the number of PD power requests that can be accommodated by the PSE, the PSE needs to attribute power budgets to each PSE port in an accurate manner. A failure to do so will result in a portion of the fixed power budget being reserved for a non-existent use.

Aside from the obvious inefficiency in failing to accommodate certain PD power requests that otherwise could have been granted, the operation of the PSE power supply at less than a full load is also inefficient. This results from a typical power supply efficiency curve that is highest at full load.

As noted above, efficiency in a PoE system can be improved through an accurate estimation of a power loss attributable to the Ethernet cable. This power loss ($P=i^2R_{cable}$) can be determined through the identification of a resistance of the Ethernet cable through resistive measurements in the PoE subsystem. In various embodiments, the resistance of the cable can be estimated based on the determined Ethernet cable type, the length of the cable, and the existence of connectors in the cable link. For example, a Category 3 Ethernet cable has an estimated resistance of 0.2 Ω/meter, while a Category 5 Ethernet cable has an estimated resistance of 0.12 Ω/meter. As the resistance of the Ethernet cable is proportional to its length, so also is the power loss attributable to the Ethernet cable.

The ability of a PSE or PD to determine the power loss attributable to the cable is dependent on the diagnostic capability of the PHYs or associated subsystems. While the accuracy of the power loss attributable to the cable can be improved through the increase in diagnostic capabilities of the PHYs or associated subsystems, the larger risk in correctly budgeting the power loss attributable to the Ethernet cable is a potentially uncoordinated power budgeting process that is carried out between the PSE and PD.

To illustrate this risk, consider a power budgeting scenario that accounts for the actual power loss attributable to the Ethernet cable. For simplicity, it is assumed that the actual PoE link is 50 meters of Category 5 cable, which has an estimated resistance of 6Ω. For simplicity of illustration, assume that the PoE link carries 1 A of current, which is higher than the current 350 mA PoE specification. The estimated power loss attributable to the Ethernet cable would therefore be $P_{Loss}=(1\ A)^2*6\Omega=6\ W$.

Typically, the PD would report its power need (e.g., 15 W) and the PSE would add the worst-case power loss attributable to the Ethernet cable (i.e., 12 W), resulting in a power budget of 27 W assigned to that port. If either the PSE or PD is designated to perform a proper budget assessment that considers the actual power loss attributable to the Ethernet cable, then the power budget of 21 W would be assigned to that port. Over budgeting by the PSE for that port is thereby averted.

If the PD has sufficient diagnostic capabilities to estimate the cable resistance, then the PD can determine the estimated 6 W power loss attributable to the Ethernet cable. The PD would then request a power budget of 9 W, instead of 15 W. When this 9 W request is received by the PSE, the PSE would then add the full worst case power loss of 12 W, thereby yielding a final power budget of 21 W assigned to that port. If the PSE has sufficient diagnostic capabilities to estimate the cable resistance, then the PD would simply request its needed power budget (i.e., 15 W), to which the PSE would add the estimated 6 W power loss attributable to the Ethernet cable, thereby yielding a final power budget of 21 W assigned to that port.

The problem occurs when both the PSE and PD attempt to compensate for the actual power loss attributable to the cable without the other side knowing. For example, assume as above that the PD attempted to compensate for the lack of diagnostic capabilities of the PSE and submitted a 9 W power request. If the PSE's diagnostic capabilities provided the PSE with the knowledge that the estimated power loss attributable to the Ethernet cable was actually 6 W, then the PSE would budget 15 W (9 W PD power budget plus 6 W cable power loss) for that port. This 15 W power budget would be below the actual power budget needed for the port and can cause the port to be switched off.

As this example scenario illustrates, the lack of coordination in the budgeting process between the PHYs in the PSE and PD can produce an under-budgeting condition. This under-budgeting condition can be problematic to the operation of the PSE, and at the least is an inefficient solution in providing power to a plurality of PDs.

As has been described in the example above, the simple lack of coordination between a pair of devices can be problematic. More generally, however, the lack of understanding in the specific diagnostic capabilities between a pair of PHYs can also lead to inefficiencies.

In the above example, it was assumed that both PHYs had roughly equivalent diagnostic capabilities that could enable an accurate diagnosis of the power loss attributable to the Ethernet cable. In a scenario where the PHYs had different levels of diagnostic capabilities, then a situation could arise where one PHY determined that 50 meters of cable existed, while the other PHY determined that 55 meters of cable existed. In this scenario, even assuming that the PHYs could coordinate their power budgeting efforts to prevent an under-budgeting scenario, a question of accuracy can arise in arbitrating between the different diagnostic results. In one embodiment, the arbitration between different diagnostic results can include an averaging of results, selection of a worst-case result, discounting of less-accurate results, etc.

In general, diagnostic capabilities continue to advance and the potential for greater accuracy exists in new generations of PHY. As different generations of PHYs will continue to interoperate in a network, a mechanism for coordinating and arbitrating between the diagnostic capabilities in the PHYs in both ends of the link is needed.

It is a feature of the present invention that such coordination and arbitration can be enabled through advanced link exchanges that enable greater visibility in the channel, physical layer, and data layer information and capabilities that exist between a pair of PHYs. Without such coordination and arbitration, sub-optimal solutions for the provision of network services would result.

Figure 2:
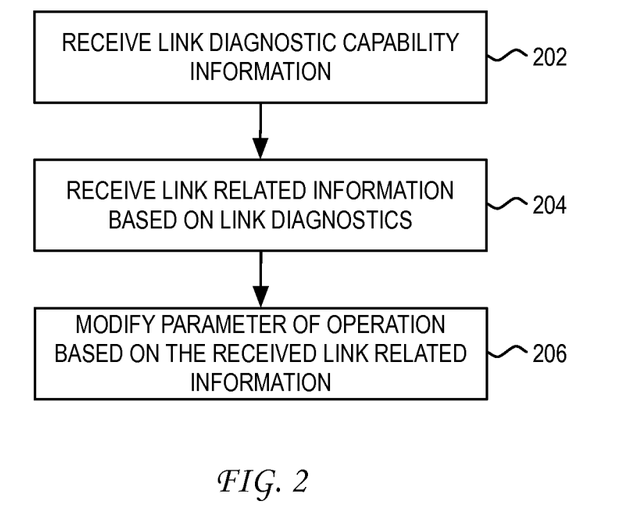
FIG. 2 illustrates a first flowchart of a process of the present invention.

To illustrate one aspect of operation of the present invention, reference is now made to the flowchart of FIG. 2. As illustrated, the process begins at step 202, where a first PHY received link diagnostics capability information from a second PHY. While the specific form and type of link diagnostic capability information would be implementation dependent, the link diagnostic capability information would enable the first PHY to determine the link diagnostic capabilities of the second PHY. In one example, the link diagnostic capability information can be an identifier that is associated with a particular diagnostic version set implemented by the PHY. As has been described in the example above, the knowledge of the particular link diagnostic capabilities of a remote PHY would enable the local PHY to adjust its operation (e.g., power budget process) based on the known diagnostic capabilities of the remote PHY.

In one embodiment, the link diagnostic capability information is exchanged as part of an auto-negotiation process between PHYs. In general, auto-negotiation provides a linked device with the capability to detect the abilities (modes of operation) supported by the device at the other end of the link, determine common abilities, and configure for joint operation. Typically, the auto-negotiation process identifies the best possible mode of operation (or highest common denominator) that is shared by the two PHY devices. Here, a particular priority between different modes of operation can be defined, for example, where a higher speed is preferred over a lower speed, and a full duplex mode of operation is preferred over a half duplex mode of operation at the same speed. The result of the auto-negotiation process is for the communication parameters for the link to resolve to the highest performing common operating protocol that can be used on the link.

Figure 3:
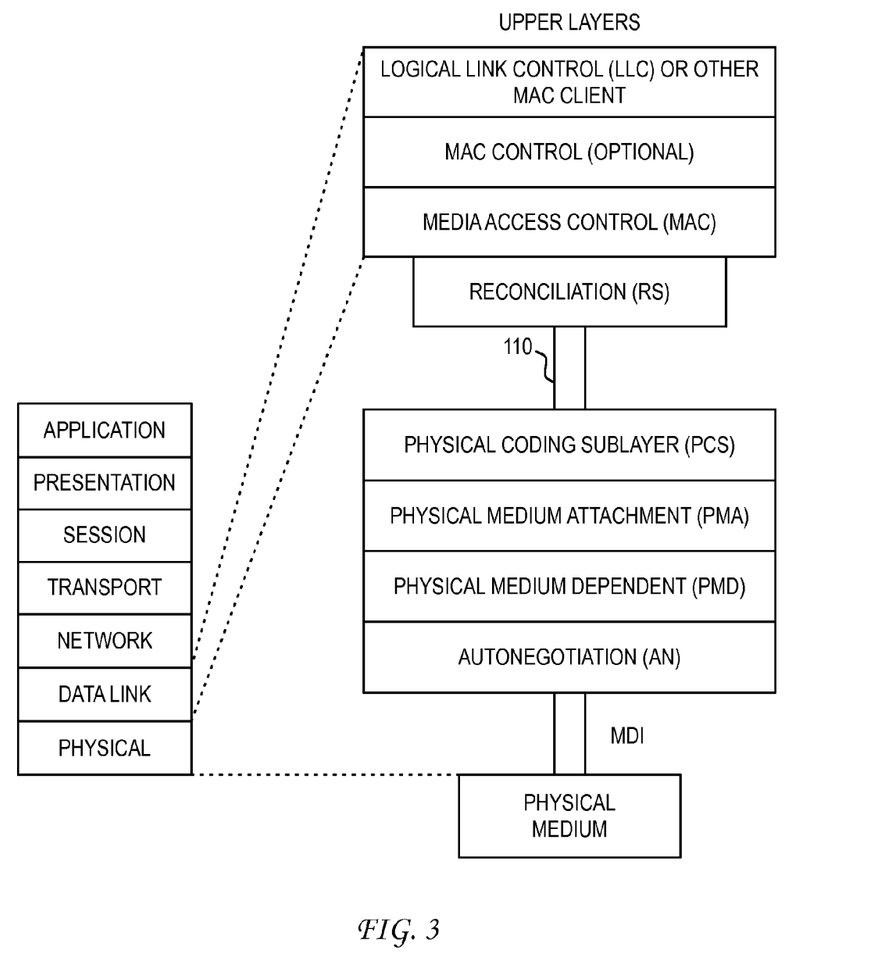
FIG. 3 illustrates the ISO Open System Interconnection (OSI) reference model and its mapping to the IEEE 802.3 layering.

As illustrated in FIG. 3, auto-negotiation (AN) is included as part of the PHY along with the physical coding sublayer (PCS), physical medium attachment (PMA), and physical media dependent (PMD). The PHY interfaces with a particular physical medium (e.g., twisted pair cabling) over a medium dependent interface (MDI).

Figure 4:
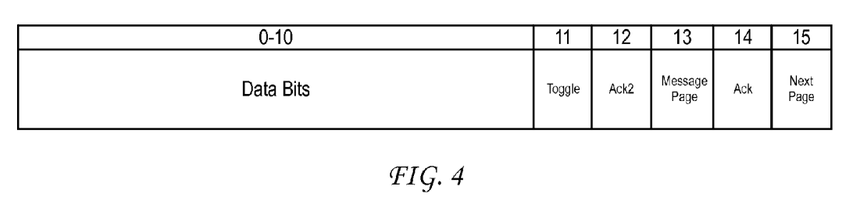
FIG. 4 illustrates an example of an unformatted page used in auto-negotiation.

In one embodiment, the link diagnostic information and/or capability information is exchanged using auto-negotiation next page message(s). FIG. 4 illustrates an example format of an unformatted next page message. In the auto-negotiation process, one or more of these unformatted next page messages would be sent in addition to the predefined messages (e.g., base link code word) that are used in the identification of the standard modes of operation (e.g., 10/100/1000). By this process, an augmented auto-negotiation process would result that would support the exchange of link diagnostic information and/or capability information between PHYs.

In one example, the auto-negotiation process can be used to exchange information regarding the discovered cabling type. This exchange of discovered cabling type can be used by the PHYs to power up in a more optimal way without certain engines (e.g., FEXT/NEXT/Echo) and/or in certain modes (e.g., simplex vs. duplex).

As would be appreciated, the specific mechanism used to exchange link diagnostic information and/or capability information between PHYs would be implementation dependent without departing from the scope of the present invention. In one embodiment, the link information or diagnostic capability information can be exchanged between the PHYs using type-length-value packets such as that used in the Link Layer Discovery Protocol (LLDP). For example, an LLDP exchange can be used in PoE to augment the dynamic power negotiation capabilities of the data link layer mechanism used in 802.3at-2009. In yet another embodiment, the link diagnostic information and/or capability information can be exchanged using some form of physical signaling that is defined for such an exchange process.

Once a local PHY has received link diagnostic capability information from the remote PHY, the local PHY can then benefit from link-related information that is transmitted by the remote PHY to the local PHY at step 204. In the above example, such link-related information was exemplified by power budget request information that is transmitted by the PD to the PSE, wherein such power budget request information included an adjusted power request based on the link diagnostics of the PD. If the PSE had previously known that the PD had access to sufficient diagnostic capabilities to accurately estimate the power loss attributable to the Ethernet cable, then the PSE could properly interpret and leverage the power request information from the PD without creating an under budgeting situation. This would be true whether or not the PSE had sufficient link diagnostic capabilities on its own.

The receipt of link diagnostic capability information from the remote PHY enables the local PHY to properly interpret link-related information from the remote PHY. Such proper interpretation then enables the local PHY to modify a parameter of operation of the local PHY based on the received link-related information. In the above example, such modification can be represented by the setting of an accurate power budget for the PD.

As would be appreciated, the link-related information that is received by a local PHY can represent various types of parameters that can assist the local PHY. In a simple example, the link-related information can be a link length that would enable the local PHY to calculate a PoE power loss. In another example, the link-related information an be a cable type (e.g., Category 3, 5, 5e, etc.).

To illustrate the various potential uses of the present invention, consider a data center application that exchanges link information and/or capability information. In this example application, assume that one PHY has advanced link diagnostic capabilities that can determine a cable type, while the other PHY does not have those same advanced link diagnostic capabilities. Here, one of the PHYs can use its link diagnostics to determine that the link is supported by Category 7A cabling. With such information, a PHY could choose to power down certain subsystems that perform echo, cross talk and/or noise cancellation/compensation functions (e.g., NEXT, FEXT, ANEXT, AFEXT, etc). By the exchange of link diagnostic capability information, followed by link-related information generated using those link diagnostic capabilities, both ends of the link can participate in the generation of power savings. As would be appreciated, the use of link diagnostics to determine the type of physical cabling that supports the link can be used in a variety of ways to identify potential modes of operation, power savings, or the like. One of the potential modes of operation include running the PHYs at a faster rate should the physical medium support it. For example, if the link information exchanged through auto-negotiation or LLDP indicates an improved channel, then a Direct Attach Copper link could be run at 12 G, a 40 GBASE-CR4 or 40 GBASE-KR4 link could be run at 50 G, etc.

As has been described, the exchange of link diagnostic capability information enables a pair of PHYs to coordinate and leverage the link-related information generated by those link diagnostics. In another embodiment of the present invention, the exchange of link diagnostic capability information can be used to arbitrate varying levels of link diagnostic capabilities that are available to a pair of PHYs. To illustrate this feature of the present invention, reference is now made to the flowchart of FIG. 5.

Figure 5:
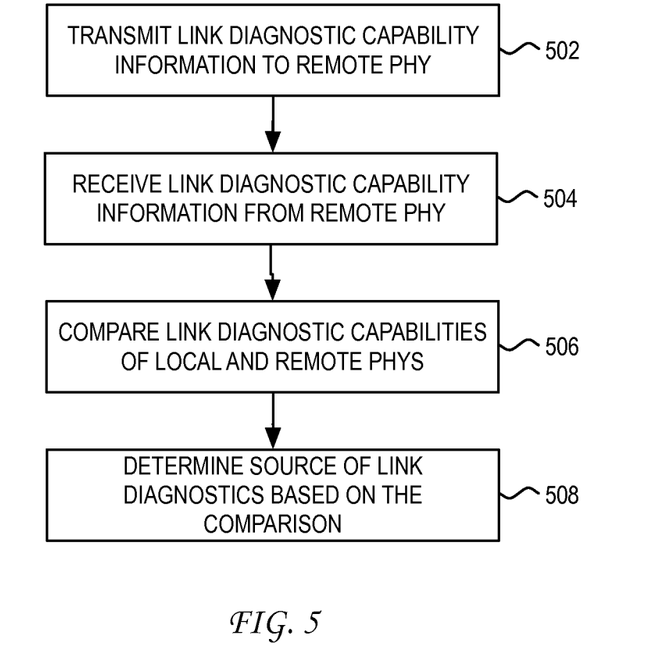
FIG. 5 illustrates a second flowchart of a process of the present invention.

As illustrated, the process begins at step 502 where a local PHY transmits first link diagnostic capability information to a remote PHY, wherein the first link diagnostic capability information enabling a determination of the link diagnostic capabilities of the local PHY. Similarly, at step 504, the local PHY receives second link diagnostic capability information from the remote PHY, wherein the second link diagnostic capability information enabling a determination of the link diagnostic capabilities of the remote PHY. As noted above, the exchange of link diagnostic capability information between the PHYs can be performed using a variety of mechanism, including but not limited to auto-negotiation, TLV messaging, physical signaling, or the like.

In addition to the promotion of awareness of the link diagnostic capabilities of a given PHY, the exchange of link diagnostic capability information enables the PHYs to compare link diagnostic capabilities. This is significant since varying levels of link diagnostic capabilities between PHYs will be commonplace. Where such variation exists, there exists the potential for duplicate functionality yet at different levels of precision or accuracy. In this example scenario, the exchange of diagnostic capability information can enable the PHYs to determine which end of the link can be used as a source of link-related information. For example, if one PHY has more reliable link diagnostics to determine a link length, cable type, etc., then that PHY should be recognized as the source of certain link-related information. In other words, the superior link diagnostics of the other end of the link can effectively replace existing link diagnostic capabilities locally. In one embodiment, information regarding the accuracy of the measurements themselves can be exchanged. In another embodiment, multiple measurements can be exchanged over time to assess a relative accuracy.

To accommodate such arbitration between link diagnostic capabilities, a comparison is performed on the link diagnostic capability information that is exchanged between PHYs at step 506. In one embodiment, this comparison can be based on a predefined ordered list of link diagnostic capabilities that can represent various levels of functionality. In general, the more well-defined the link diagnostics features are amongst a single manufacturer or a group of manufacturers, the easier it would be to discern variations between devices. As would be appreciated, a single manufacturer can define an ordered list of link diagnostic capabilities in a way that would enable a pair of PHYs to determine, through a simple exchange of version information, which PHY had superior link diagnostics.

Once an effective comparison is made, the PHYs can then determine, at step 508, which PHY would be considered a source of such link-related information. Recognition of one the PHYs as a source of link-related information is significant in that a coordinated process of delivery of network services can occur. Without an understanding of the link diagnostic capabilities on two sides of the link, both sides of the link are left to operate individually, resulting in sub-optimal configurations.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A network device, comprising:
   a receiver configured to receive a data communication signal from a link partner via a communication cable;
   a first measurement subsystem having first diagnostic abilities and configured to measure one or more characteristics of a communication channel that includes the communication cable; and
   a controller communicatively coupled to the receiver, the controller configured to receive second link diagnostic capability information received by the receiver from the link partner via the communication cable, the received second link diagnostic capability information enabling the controller to determine second diagnostic abilities of a second measurement subsystem in the link partner to measure one or more characteristics of the communication channel, and
   the controller configured to compare the second diagnostic abilities of the second measurement subsystem in the link partner to the first diagnostic abilities of the first measurement subsystem to measure one or more characteristics of the communication channel, and to designate, based on the comparison of the first diagnostic abilities to the second diagnostic abilities, one of the first measurement subsystem and the second measurement subsystem as a source of link related measurement information used to configure operation of a network service over the communication channel,
   wherein the second link diagnostic capability information is received by an autonegotiator via an auto-negotiation next page message.

2. The network device of claim 1, wherein the first measurement subsystem is a physical layer measurement subsystem.

3. The network device of claim 1, wherein the link related measurement information is a link length.

4. The network device of claim 1, wherein the link related measurement information is a network cable type.

5. The network device of claim 1, wherein the link related measurement information is a cable power loss budget.

6. The network device of claim 1, wherein the second link diagnostic capability information is an identifier of a diagnostic version.

7. The network device of claim 1, wherein the controller is a power over Ethernet controller.

8. A method performed by a network device, the network device comprising a receiver configured to receive a data communication signal from a link partner via a communication cable and a first measurement subsystem having first abilities and configured to measure one or more characteristics of a communication channel that includes the communication cable, the method comprising:
   receiving, by the receiver from the link partner via the communication cable, second link diagnostic capability information that enables a determination of second abilities of a second measurement subsystem in the link partner to measure one or more characteristics of the communication channel;
   comparing the second abilities of the second measurement subsystem to measure one or more characteristics of the communication channel to the first abilities of the first measurement subsystem in the network device to measure one or more characteristics of the communication channel; and
   designating, based on the comparison of the first abilities to the second abilities, one of the first measurement subsystem and the second measurement subsystem as a source of link related information used to configure operation of a network service over the communication channel,
   wherein the second link diagnostic capability information is received by an autonegotiator via an auto-negotiation next page message.

9. The method of claim 8, wherein the first measurement subsystem is a physical layer measurement subsystem.

10. The method of claim 8, wherein the link related measurement information is a link length.

11. The method of claim 8, wherein the link related measurement information is a network cable type.

12. The method of claim 8, wherein the link related measurement information is a cable power loss budget.

13. The method of claim 8, wherein the second link diagnostic capability information is an identifier of a diagnostic version.

14. The method of claim 8, wherein the network service is power over Ethernet.

15. The network device of claim 1, wherein the first measurement subsystem is a physical layer measurement subsystem, and the second measurement subsystem is a physical layer measurement subsystem remote to the first measurement subsystem.

16. The method of claim 8, wherein the first measurement subsystem is a physical layer measurement subsystem, and the second measurement subsystem is a physical layer measurement subsystem remote to the first measurement subsystem.

* * * * *